United States Patent [19]

Sansalone

[11] Patent Number: 5,429,278

[45] Date of Patent: Jul. 4, 1995

[54] PORTABLE GARDEN POWDER DUSTER

[76] Inventor: Dominic A. Sansalone, 5421 Menlo Ct., Barberton, Ohio 44203

[21] Appl. No.: 239,611

[22] Filed: May 9, 1994

[51] Int. Cl.[6] ............................................. B65G 69/06
[52] U.S. Cl. ................................... 222/195; 222/325; 222/333; 222/637; 406/38; 406/141
[58] Field of Search ............... 222/195, 325, 333, 630, 222/637; 406/38, 136, 139, 141, 142, 146

[56] References Cited

U.S. PATENT DOCUMENTS

| 197,601 | 11/1877 | Cassidy | 406/136 |
|---|---|---|---|
| 999,275 | 9/1911 | Theim | 406/139 |
| 1,276,653 | 8/1918 | Herbert et al. | 406/136 |
| 1,406,903 | 2/1922 | Rose | 222/195 X |
| 1,561,039 | 11/1925 | Walker | 406/136 X |
| 1,838,648 | 12/1931 | Atwood | 222/630 |
| 2,029,408 | 2/1933 | Bransen et al. | 91/8 |
| 2,126,924 | 8/1938 | Rose | 222/195 X |
| 2,675,147 | 4/1954 | Odom | 406/136 |
| 2,792,151 | 5/1957 | Wagner | 222/193 |
| 2,870,565 | 1/1959 | Martin | 43/148 |
| 3,123,362 | 3/1964 | Elvers | 275/1 |
| 3,854,634 | 12/1974 | Hart | 222/192 |
| 4,256,241 | 3/1981 | Mesic | 222/85 |
| 4,678,377 | 7/1987 | Bouchard | 406/139 |
| 5,226,567 | 7/1993 | Sansalone | 222/195 |

FOREIGN PATENT DOCUMENTS

| 505717 | 9/1954 | Canada | 406/146 |
|---|---|---|---|
| 978700 | 4/1951 | France | 406/146 |

Primary Examiner—Andres Kashnikow
Assistant Examiner—Joseph A. Kaufman
Attorney, Agent, or Firm—Frank J. Troy, Sr.

[57] ABSTRACT

A portable garden powder duster for applying dusting agent to garden plants is provided. The powder duster comprises an air blower, an air-flow receiving tube removably attached to the air-blower and a dusting agent container removably attached to the bottom of the air-flow receiving tube. The air-flow receiving tube contains a special V-shaped air baffle attached to the bottom of the tube for efficient direction of air flow, a positive air duct located at the bottom of the baffle on the positive or air entering side of the baffle, a circumferential hole located under the air baffle and a rectangular shaped hole located at the bottom of the baffle on the negative side thereof. The air-flow receiving tube has a greater diameter on the positive side of the baffle than on the negative side thereof. The dusting agent container includes a tube having a plurality of slots each containing an air deflector which is in communication with the positive air duct of the air-flow receiving tube and which extends from the top of the container to the bottom portion thereof, an impeller for agitating dusting agent which extends from the top of the container to the bottom portion of the container and is connected to the power source of the air blower, and a rectangular shaped hollow discharge member containing a plurality of circumferential holes which extends vertically from the top of the container to the bottom portion thereof and upwardly into the air-flow receiving tube on the negative side of the baffle.

6 Claims, 6 Drawing Sheets

PORTABLE GARDEN POWDER DUSTER

BACKGROUND OF THE INVENTION

The present invention relates to a portable apparatus for dispensing powder or other particulate matter in an air or gaseous stream. More particularly, the invention relates to a portable garden powder duster for applying dusting agent to garden plants.

Various types of apparatus for applying powder or other materials are known in the prior art as illustrated by the following patents:

Canadian patent 505717 to Griffin relates to a powder blower for use by barbers having as its principal object the blowing of air and powder to remove loose hair from the neck and face and to dry the skin. The reference powder blower comprises an electric air blower, an air flow receiving tube containing an air scoop having a tubular extension which extends from the air-flow receiving tube into the bottom portion of a dusting agent receptacle or container, a dusting agent container having a lid containing an input hole and an output hole, an L-shaped powder outlet nozzle which extends from the upper portion of the dusting agent container into the air-flow receiving tube and an on and off switch positioned on the L-shaped powder outlet nozzle.

U.S. Pat. No. 4,678,377 to Bouchard relates to an apparatus for dispensing particulate matter which comprises an amorphous bag or pouch containing powder, a gas inlet at one end of the pouch adapted to receive a pressurized gaseous stream from an air blower and a gas outlet at the opposite end of the pouch which directs the gas stream out of the pouch, preferable to an elongated delivery tube. By squeezing and manipulating the pouch and powder therein, the amount of powder entrained in the gas stream within the pouch can be controlled.

U.S. Pat. No. 4,256,241 to Mesic relates to a fluid-solid mixing and dispensing apparatus primarily intended for use in the application of pesticide dust. The apparatus comprises a blower and a removable, disposable pesticide dust cartridge attachable in fluid communication relation to at least a portion of the blower's fluid flow stream. A volume control is provided so as to regulate the quantity of fluid flowing through the cartridge, thereby regulating the quantity of pesticide dust actually dispensed.

U.S. Pat. No. 2,870,565 to Martin relates to a dust-disseminating device which is attached to a hopper having an open top and containing a quantity of dusting material. The dust-disseminating device includes a cover arranged to bridge the open top of the hopper and adapted to be detachably secured thereto to provide an enclosed chamber wherein the dusting material may be gradually fed into and entrained by an air stream by an activating means for dissemination. Advantageously a blower may be associated with the hopper to introduce the air stream though the cover into the chamber provided by the hopper. The air stream produced by the blower is projected downwardly and forwardly in the chamber by a baffle which is constructed to direct the air stream to make multiple passes through the chamber whereby the dusting material is effectively entrained in the air stream. The chamber and baffle are shaped and dimensioned to cause the air stream with entrained dusting particles to change direction sharply during passage through the chamber whereby larger dust particles tend to automatically segregate from the more finely divided and entrained particles.

However, while a number of such powder dusters are described in the prior art, such powder dusting devices have not proven to be economically or commercially attractive for several reasons including their complexity, lack of portability, high cost, tendency to clogging or other problems. Accordingly, there continues to be a need for a portable garden powder duster which is simple in construction, low in cost and capable of more continuous operation without clogging.

SUMMARY OF THE INVENTION

In accordance with the present invention, a portable garden powder duster for applying dusting agent to plants comprises an air blower, an air-flow receiving tube removably attached to the air blower and a dusting agent container removably attached to the bottom of the air-flow receiving tube.

The air-flow receiving tube contains a special V-shaped air baffle attached to the bottom of the air-flow receiving tube which extends vertically through only a portion of the diameter of the tube thereby leaving a space over the top of the baffle for the passage of air and a positive side in communication with the main flow of air from the air blower and a negative side, a positive air duct located at the bottom of the baffle on the positive side of the baffle, a circumferential hole located under the air baffle and a rectangular shaped hole located at the bottom of the baffle on the negative side. The air-flow receiving tube has a greater diameter on the positive side of the baffle than on the negative side thereof.

The dusting agent container contains a lid having an input hole in communication with the positive air duct, a circumferential hole in the center of the lid in communication with the hole under the baffle and a rectangular shaped discharge hole in communication with the hole on the negative side of the air baffle. The container includes an input tube having a plurality of slots each containing an air deflector with the input tube extending from the input hole in the container lid to the bottom portion of the container, an impeller for agitating dusting agent which extends from the circumferential hole in said lid to the bottom portion of the container and is connected to the power source of the air blower by means of a line, and a rectangular shaped hollow discharge member containing a plurality of circumferential holes which discharge member extends vertically downwardly from the container lid to the bottom portion of the container and upwardly through the hole in the container lid and corresponding hole in the air-flow receiving tube and into said tube on the negative side of the air baffle.

In a preferred embodiment, a control lever is mounted on the top of the dusting agent container lid to control the flow of air passing through the positive air duct into the dusting agent container.

In operation, the blower means generates a flow of air or other gas which passes into the air-flow receiving tube. A portion of the air flow passes over the air baffle through the tube while a portion of the air flow passes over the air baffle through the tube and is discharged from the end of the tube while a portion of the air flow is diverted by the air baffle through the positive air duct into the input tube and then into the dusting agent container. A portion of the air passing into the input tube passes through the slots therein and is deflected by the air deflectors into the dusting agent container to aid in mixing the air and dusting agent. The impeller in the container further aids in mixing the air and dusting agent. The air-dust mixture then passes into and through the rectangular shaped hollow discharge member which contains a plurality of circumferential holes to provide additional mixing and into the air-flow receiving on the negative side of the air baffle. The air flow passing over the open space above the baffle picks up the dusting agent which is then discharged from the end of the air-flow receiving tube and onto the plants to be dusted. The reduced diameter of the air-flow receiving tube on the negative side of the air baffle promotes more rapid removal of the air-dust mixture from the end of the tube.

Any configuration desired at the discharge end of the air-flow receiving tube will relate to the diameter of the tube, the amount of air flow generated by the blower means and the desired broadcast span of the dusting agent particles. Thus, the end of the tube could be flared as shown in FIGS. 1 and 2, conical, splayed, etc.

DETAILED DESCRIPTION

Figure 1:
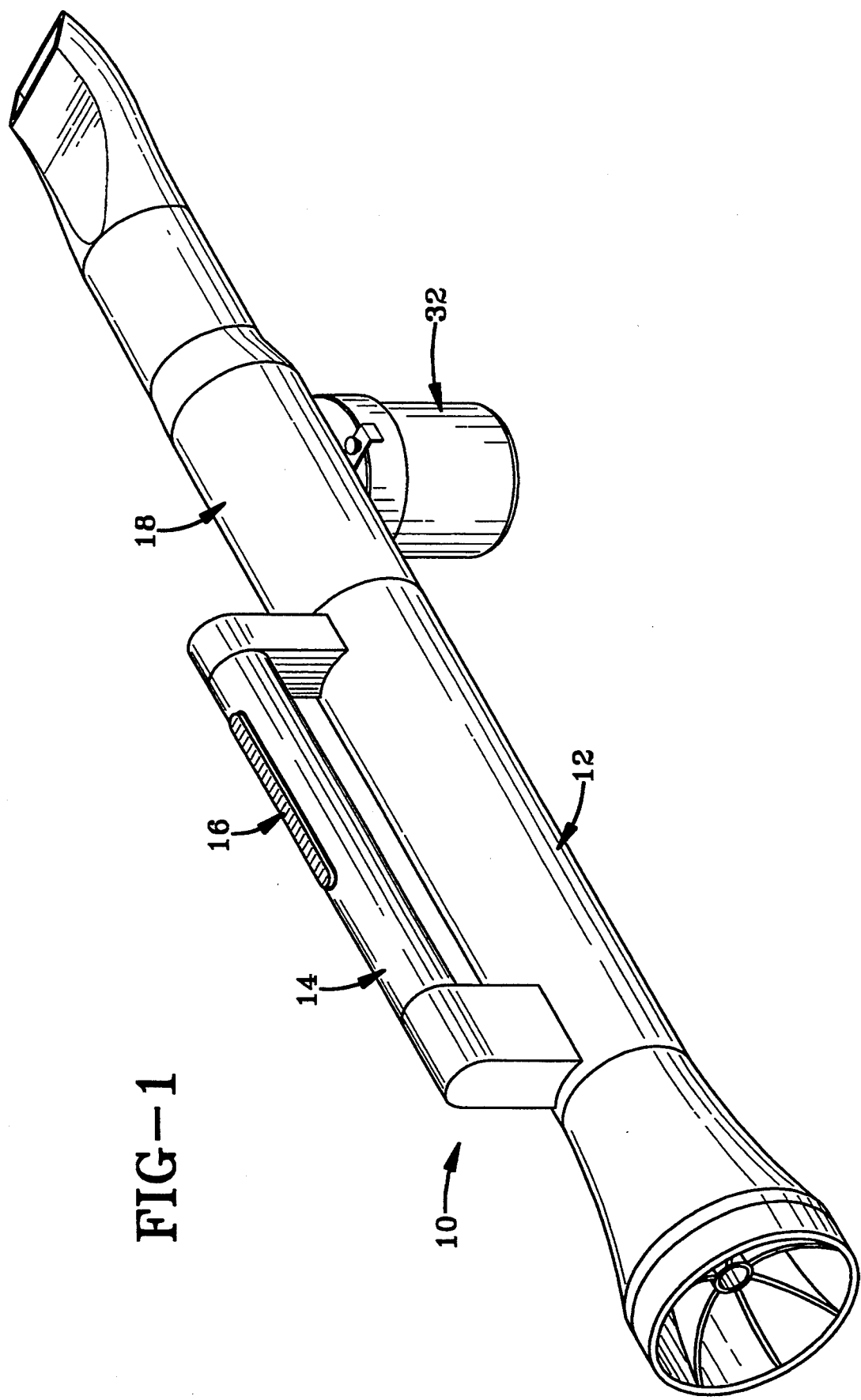
FIG. 1 is a perspective view of a garden powder duster of the invention.

The garden powder duster of the invention is generally indicated as 10 in the view of FIG. 1. Garden powder duster 10 comprises a blower means 12, an air-flow receiving tube 18 and a dusting agent container 32.

As illustrated in FIG. 1, blower means 12 includes a handle 14 and a switch 16 located on the handle. As illustrated in the drawings, blower means 12 is a cordless, battery powered air blower of conventional construction. However, a gasoline or electrically powered air blower can also be utilized. Operation of blower means 12 is regulated by simply moving the switch to the on or off position.

Figure 2:
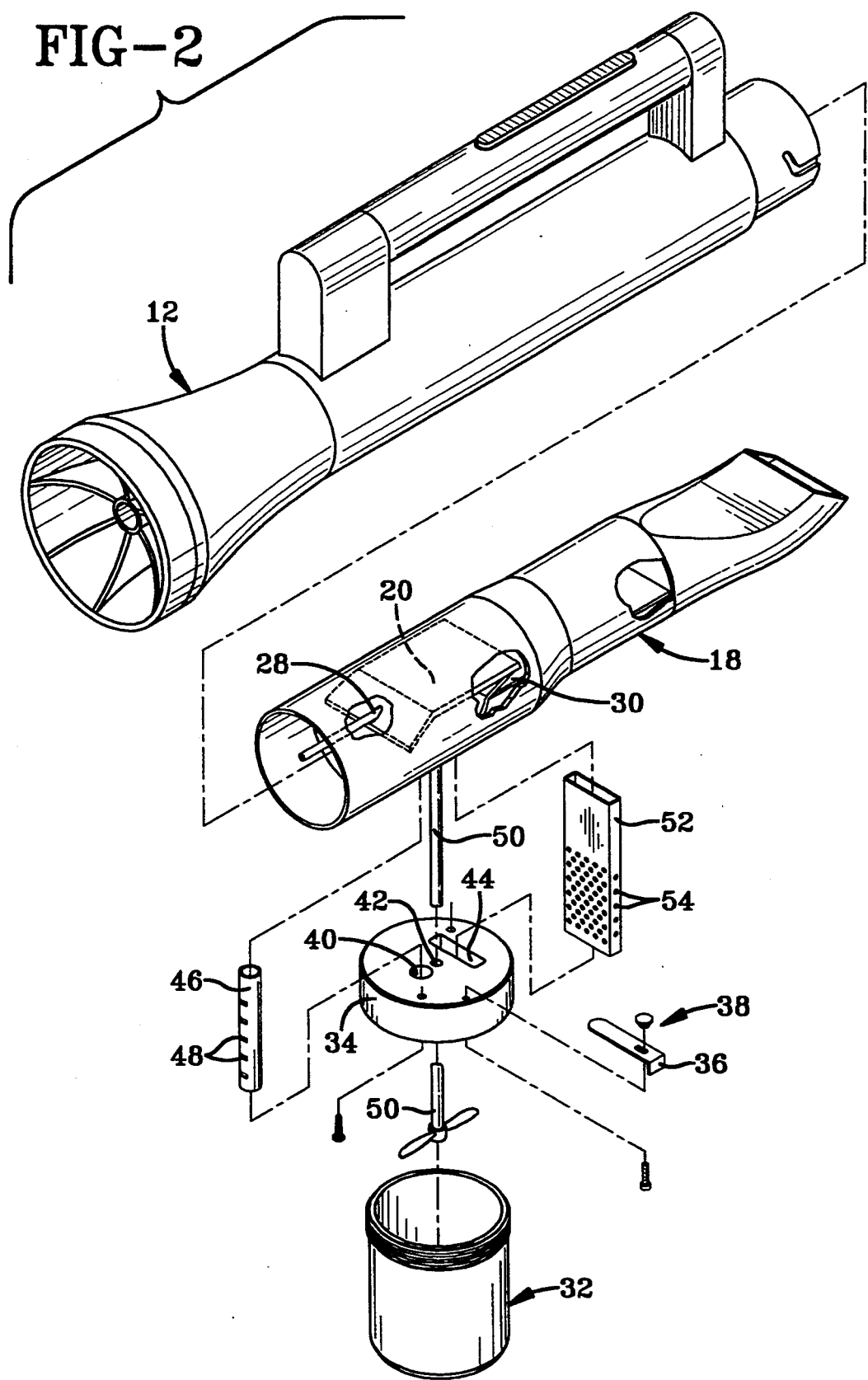
FIG. 2 is an elevational view of the garden powder duster showing the air-flow receiving tube removed from the end of the blower means and in partial section to show interior details and the dusting agent container to show details of the position of the input tube, position of the impeller, position of the rectangular discharge member, position of the control lever and the container lid.
Figure 3:
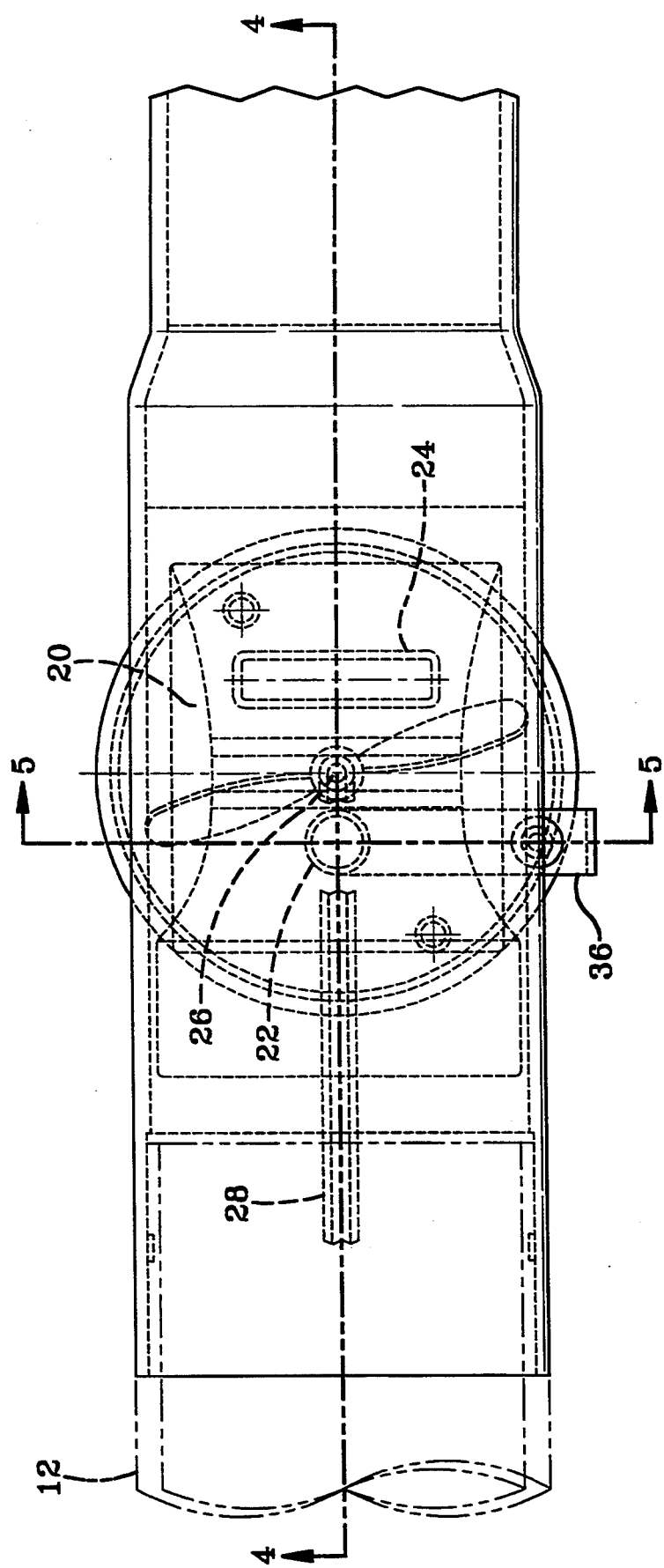
FIG. 3 is a top elevational view of the air-flow receiving tube, looking from the tube downward, partially in section to show the position of the positive air duct at the bottom of the tube, the position of the control lever which controls the volume of air passing from the positive air duct into the dusting agent container, the position of the hole in the bottom of the tube through which the impeller passes, the position of the line leading to the impeller through the air baffle and to the power source of the air blower and the position of the rectangular hole in the bottom of the tube on the negative side of the air baffle.

FIG. 2 shows partial details of air-flow receiving tube 18 which is removably attached to blower means 12 including the top of air baffle 20, a line 28 which leads from the power source of blower means 12 (not shown) into the end of air baffle 20 and in the cut out portion of the drawing a portion of the shelf 30 which is located near the top of the baffle and defines the reduced diameter portion (see FIG. 4) of the air-flow receiving tube 18. However, the details and internal construction of air-flow receiving tube 18 are much more clearly shown in FIGS. 3 and 4. As shown in FIG. 3, the air-flow receiving tube 18 includes a positive air duct 22 located in the bottom of the tube, a circumferential hole 26 located in the bottom of tube below baffle 20 and a rectangular hole 24 located in the bottom of tube 18.

Figure 4:
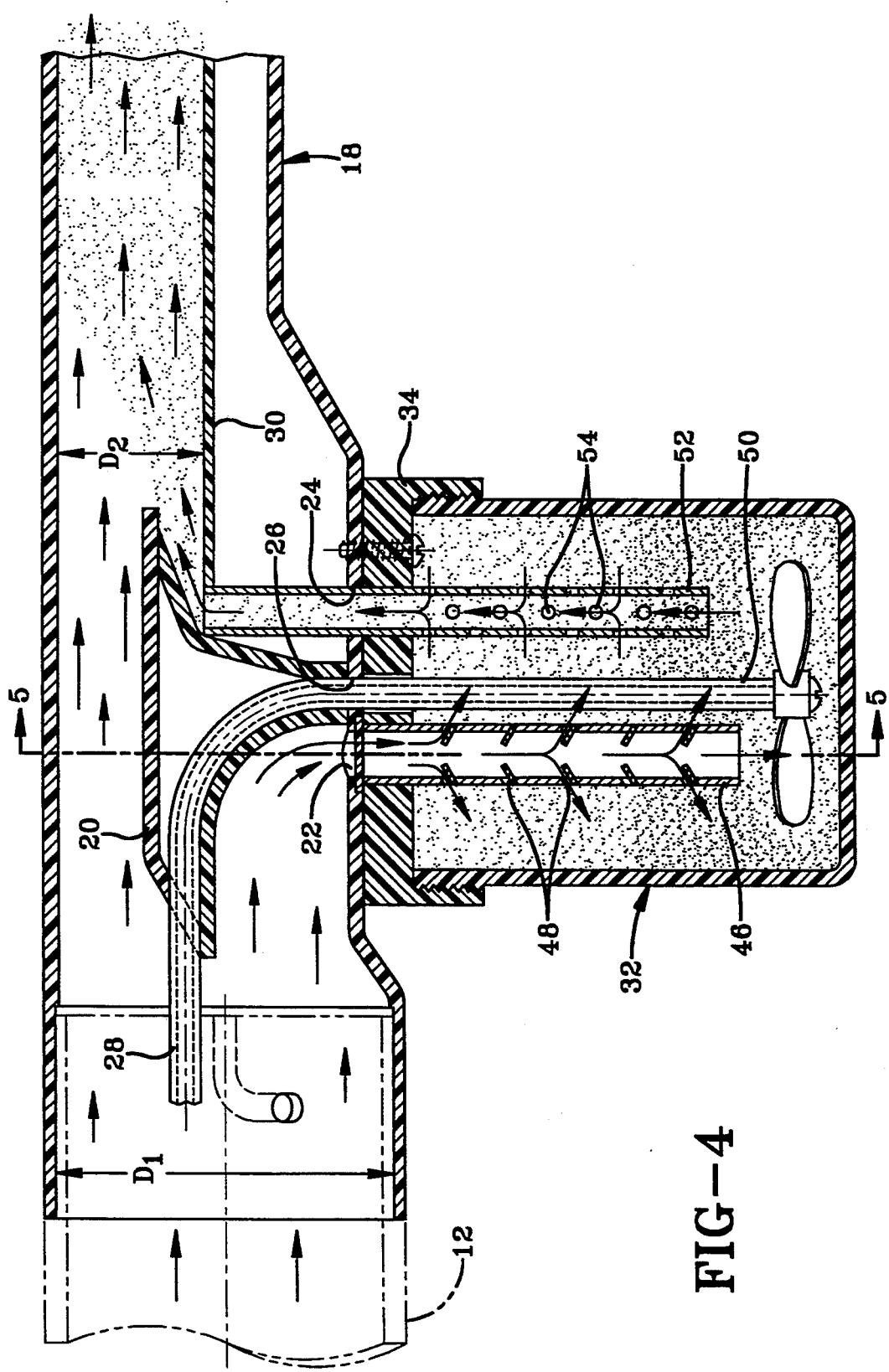
FIG. 4 is a side elevational view taken along line 4—4 of FIG. 3 with parts broken away and sectioned to show interior details of the air flow receiving tube including the position and shape of the V-shaped air baffle, the position of line leading from the power source of the air blower through the air baffle and hole at the bottom of the baffle, the position of the shelf which defines the reduced diameter of the air-flow receiving tube and the dusting agent container including the position of the input tube, the position of the impeller and the position of the hollow rectangular discharge member with arrows showing the direction of air flow through the tube and into the dusting agent container and the passage of dusting agent particles from the discharge member into and through the air-flow receiving tube.

The internal construction of air-flow receiving tube 18 is even more clearly shown in FIG. 4. Thus, positive air duct 22 is located at the bottom of air-flow receiving tube 18 on the positive or air entering side of air baffle 20. Air baffle 20 is V-shaped in construction with the positive and negative ends contoured to provide for more controlled air flow into and out of dusting agent container 32 (described below). A line or cable 28 leads from the power source of the blower means 12 (not shown) through the positive end of air baffle 20 and into the bottom of baffle 20 and through circumferential hole 26 located at the bottom of baffle 20. A rectangular hole 24 is located at the bottom of air-flow receiving tube 18 on the negative side of air baffle 20. A shelf 30 extends from the exiting or negative end of air-flow receiving tube 18 to a point just below the top of air baffle 20. This shelf serves to reduce the diameter of the tube (see D2) which aids in more rapid removal of dusting agent from the end of the tube and also serves to minimize clogging.

Air-flow receiving tube 18 as shown in FIG. 2 is removably attached to blower means 12 by means of a locking groove located on the outside of the tube at the end of blower means 12 and associated knobs or buttons (not shown) on the air entering end of air-flow receiving tube 18. However, air-flow receiving tube 18 can be securely attached to blower means 12 by various methods such as, for example, by including grooves in the end of blower means 12 and treads in the end of air-flow receiving tube 18.

Positive air duct 22, circumferential hole 26 and rectangular hole 24 can be incorporated in the bottom of air-flow receiving tube 18 by any convenient method including drilling, cutting or molding during the tube molding process. V-shaped air baffle 20 can also be incorporated into air-flow receiving tube 18 by various methods. This, for example, a groove could be cut into the bottom of the tube to the desired baffle height and the V-shaped air baffle inserted into the tube and adhered in place using a conventional adhesive. Alternatively, air baffle 20 could be incorporated into air-flow receiving tube 18 by molding during the tube molding process.

Air-flow receiving tube 18 can be made of any strong light-weight material but is preferably made of plastic.

Dusting agent container 32 as shown in FIG. 2 is removably attached to the bottom of air-flow receiving tube 18 by means of tap-in screws. However, it should be noted that dusting agent container could be attached to the bottom of the tube by molding container lid 34 onto the bottom of the tube. As shown in FIG. 2, container lid 34 includes a hole in communication with positive air duct 22, a circumferential hole 42 in communication with the hole 26 at the bottom of air baffle 20 and a rectangular hole 44 in communication with rectangular hole 24 in the bottom of air-flow receiving tube 18.

As shown in FIG. 4, the dusting agent container 32 further includes an input tube 46 which extends from the top of the container lid 34 to the bottom portion of the container 32. The input tube 46 contains a plurality of slots 48 each containing an air deflector to aid in mixing the dusting agent in the container. The dusting agent container further includes an impeller 50 which is connected to the power source of the blower means 12 by means of a line 28 or cable running through circumferential hole 42 in the container lid 34 and hole 26 at the bottom of air baffle 20. The impeller 50 extends from the top of container lid 34 to the bottom portion of container 32. Virtually any electric line or cable or air driven turbine can be used to connect impeller 50 to the power source or to drive the impeller including a speedometer cable. The impeller aids in keeping the dusting agent in suspension and provides more continuous operation without clogging.

The dusting agent container 32 further includes a hollow rectangular shaped discharge member 52 containing a plurality of circumferential holes 54. The discharge member 52 extends from the bottom portion of dusting agent container 32 through rectangular shaped hole 44 in the container lid 34 and through rectangular shaped hole 24 in the bottom of air-flow receiving tube 18 and into said tube on negative side of air baffle 20 to a point level with the top of shelf 30 of the air-flow receiving tube.

Figure 5:
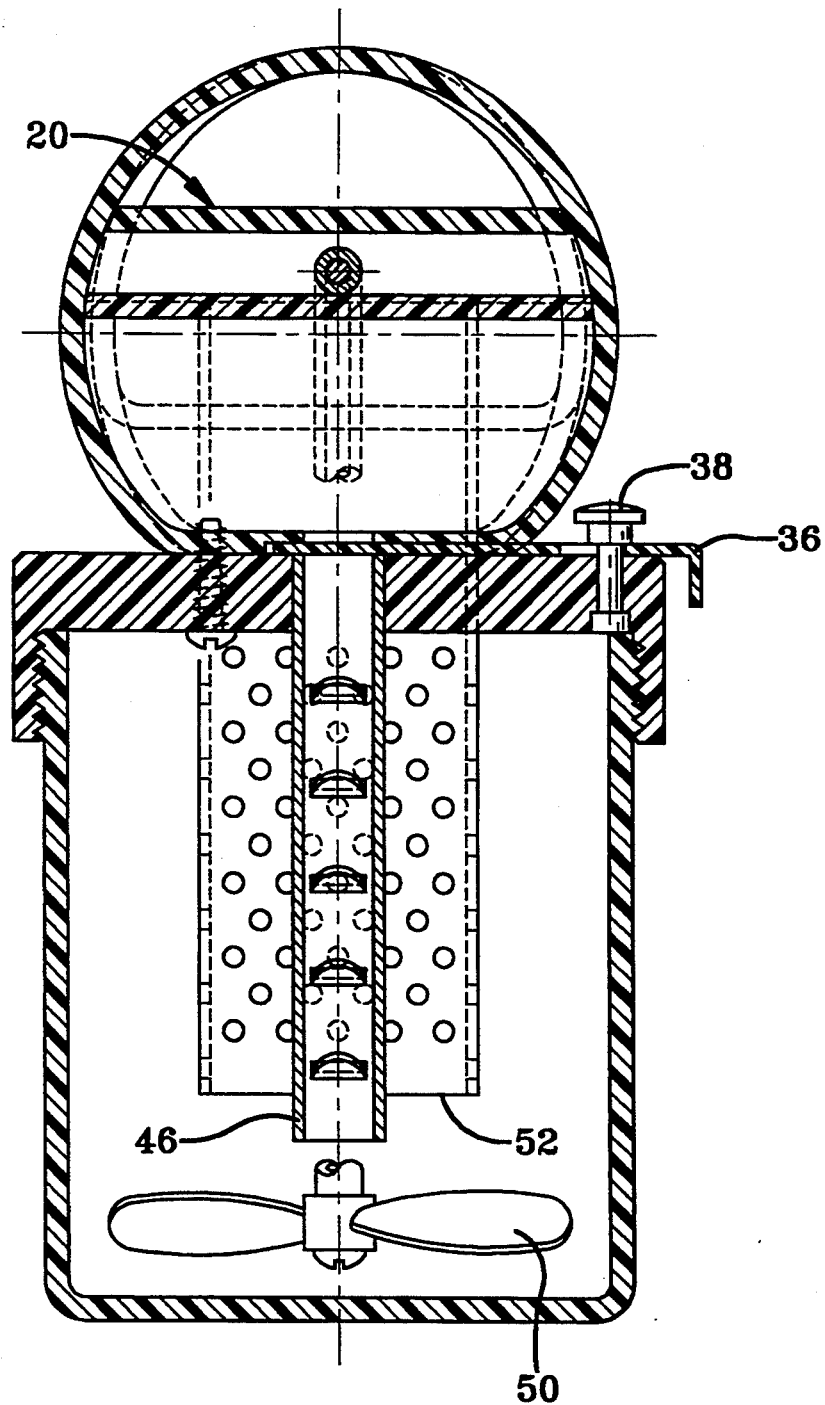
FIG. 5 is an end elevational view taken along line 5—5 of FIG. 3 looking in the direction of the arrows with parts broken away and sectioned to show interior details of the air-flow receiving tube and dusting agent container and particularly the position of the input tube, the impeller and the rectangular discharge member extending from the bottom portion of the dusting agent container and into the air-flow receiving tube.
Figure 6:
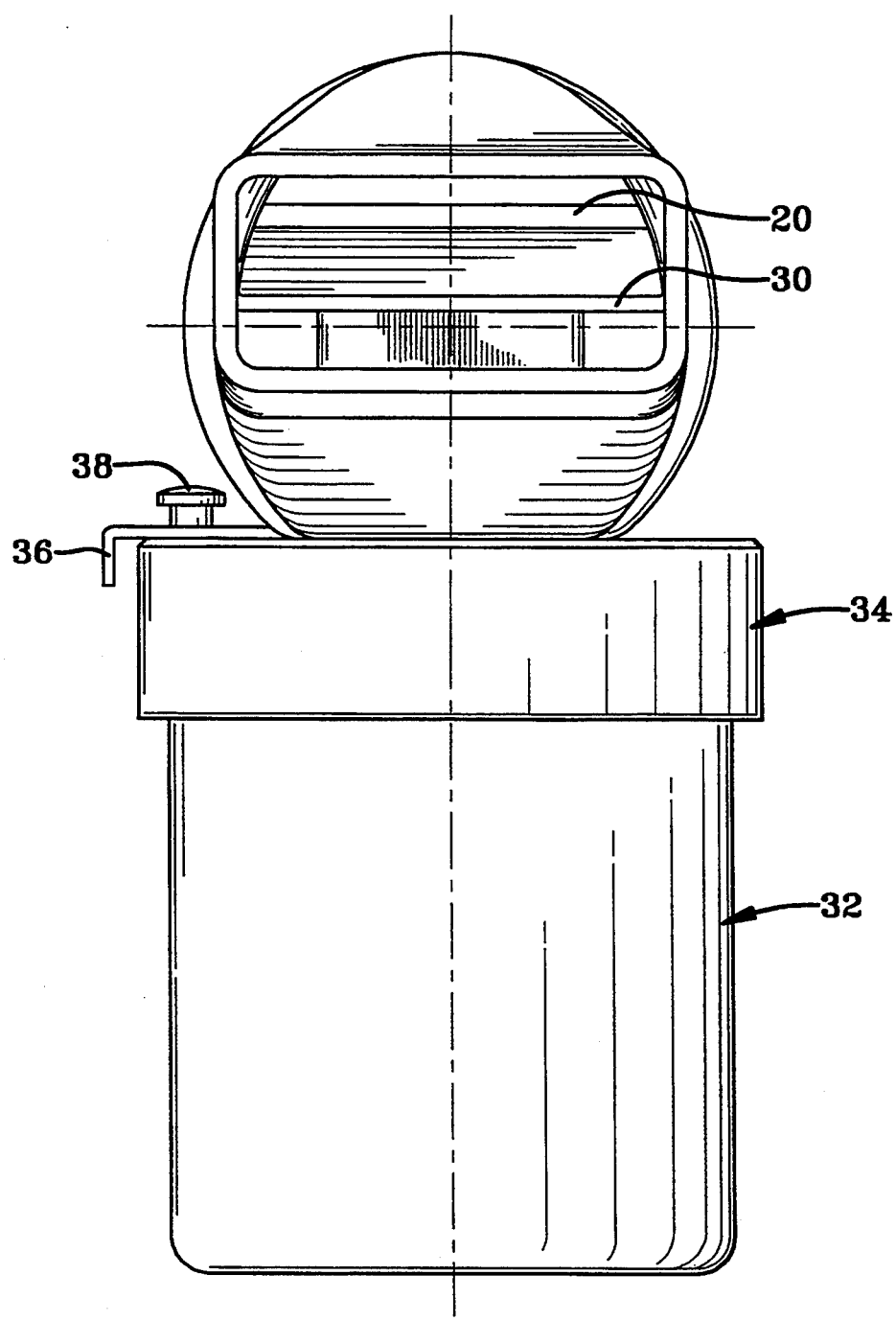
FIG. 6 is an end elevational view looking from the discharge end of the air-flow receiving tube back toward the air baffle showing the shelf defining the reduced diameter portion of the air-flow receiving tube.

As shown in FIGS. 2, 3 and 5, dusting agent container 32 in a preferred embodiment includes an adjustable control lever 36 which is mounted on container lid 34. The function of control lever 36 is to control the volume of air passing from positive air duct 22 of air-flow receiving tube 18 through input hole 40 of container lid 34 into dusting agent container 32 thereby permitting control of the air/dust ratio. Control lever 36 which is shown separated from container lid 34 in FIG. 2 includes a slot in one end permitting movement of the lever between open and closed positions in the directions indicated by the arrow in FIG. 2. The control lever 36 is slotted to facilitate adjustment and fits into a holding fastener (screw) which is adjusted such that retaining friction is exerted to hold the lever at the desired adjusted position. This will provide the ability for manual adjustment or linkage hook-up for remote adjustments. It should also be noted that the lever could be friction mounted if desired.

The dusting agent container 32 can be of any convenient type such as plastic, plexiglass, glass or the like but a strong, clear plastic is preferred.

The garden powder duster of the invention can be utilized to apply various dusting agents to garden plants. Thus, the powder duster can be used to apply particulate matter such as pesticides, herbicides and fertilizers to such plants.

Having described several embodiments of the garden powder duster of the invention, it is believed that other modifications, variations and changes will be suggested to those skilled in the art in view of the disclosure set forth herein. It is therefore to be understood that all such variations, modifications and changes are believed to fall within the scope of the present invention as defined in the claims.

I claim:

1. A portable garden powder duster for applying dusting agent to plants, said powder duster comprising in combination:

blower means whereby a main flow of air is provided;

an air-flow receiving tube removably attached to said blower means and in communication with said main air-flow, wherein said air-flow receiving tube contains a V-shaped air baffle attached to the bottom of the tube, said air baffle having a positive side in communication with the main air-flow and a negative side and said air baffle extends vertically through only a portion of the diameter of said tube thereby leaving a space over the top of said baffle for the passage of air, and wherein said air-flow receiving tube has a greater diameter on the positive side of said air baffle than on the negative side and contains a positive air duct located at the bottom of the tube on the positive side of the baffle, a circumferential hole located at the bottom of the air baffle and rectangular shaped hole located at the bottom of the tube on the negative side of the baffle; and a dusting agent container removably attached to the bottom of said air-flow receiving tube, said dusting agent container containing a lid having an input hole in communication with the positive air duct, a circumferential hole in the center of the lid and a rectangular shaped discharge hole in communication with the rectangular shaped hole located at the bottom of the air-flow receiving tube on the negative side of the air baffle, an input tube containing a plurality of slots each having an air deflector with said input tube extending from the input hole in the container lid to the bottom portion of the container, an impeller for agitating dusting agent which extends from the hole in the center of the container lid to the bottom portion of the container and is connected to the power source of the blower means by means of a line, and a rectangular shaped hollow discharge member containing a plurality of circumferential holes, said discharge member extending vertically from the bottom portion of the container through both the discharge hole in the container lid and the rectangular shaped hole at the bottom of the air-flow receiving tube on the negative side of the air baffle to a point level with the reduced diameter portion of said air-flow receiving tube.

2. The garden powder duster of claim 1 further comprising a control lever to regulate the volume of air flowing through the positive air duct of the air-flow receiving tube into the dusting agent.

3. The garden powder duster of claim 1 wherein said blower means is an air blower.

4. The garden powder duster of claim 1 wherein said blower means is an electrically powered air blower.

5. The garden powder duster of claim 1 wherein said blower means is a gasoline powered air blower.

6. The garden powder duster of claim 1 wherein said blower is a battery powered air blower.

* * * * *